(12) United States Patent
Frumkin et al.

(10) Patent No.: US 8,965,786 B1
(45) Date of Patent: Feb. 24, 2015

(54) USER-BASED AD RANKING

(75) Inventors: Michael Frumkin, Santa Cruz, CA (US); Karthik Gopalratnam, Mountain View, CA (US); Khanh Nguyen, Cupertino, CA (US); Ralph U. Gasser, Palo Alto, CA (US); Gregory J. Friedman, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 1332 days.

(21) Appl. No.: 12/388,434

(22) Filed: Feb. 18, 2009

Related U.S. Application Data (60) Provisional application No. 61/046,278, filed on Apr. 18, 2008.

(51) Int. Cl.
*G06Q 30/00* (2012.01)
*G06F 15/18* (2006.01)

(52) U.S. Cl.
USPC ....... 705/14.41; 706/12; 705/14.6; 705/14.73

(58) Field of Classification Search
USPC .......................................................... 705/10
See application file for complete search history.

(56) References Cited

U.S. PATENT DOCUMENTS

| | | | |
|---|---|---|---|
| 5,600,364 A | 2/1997 | Hendricks et al. | |
| 5,918,014 A | 6/1999 | Robinson | |
| 8,571,930 B1 * | 10/2013 | Galperin | 705/14.43 |
| 2002/0161648 A1 * | 10/2002 | Mason et al. | 705/14 |
| 2003/0149937 A1 * | 8/2003 | McElfresh et al. | 715/517 |
| 2004/0044571 A1 * | 3/2004 | Bronnimann et al. | 705/14 |
| 2005/0021397 A1 * | 1/2005 | Cui et al. | 705/14 |
| 2005/0080772 A1 * | 4/2005 | Bem | 707/3 |
| 2005/0096979 A1 * | 5/2005 | Koningstein | 705/14 |
| 2005/0097204 A1 * | 5/2005 | Horowitz et al. | 709/223 |
| 2005/0288954 A1 * | 12/2005 | McCarthy et al. | 705/1 |
| 2006/0020596 A1 * | 1/2006 | Liu et al. | 707/6 |
| 2006/0069616 A1 * | 3/2006 | Bau | 705/14 |
| 2006/0190354 A1 * | 8/2006 | Meisel et al. | 705/26 |
| 2006/0212350 A1 * | 9/2006 | Ellis et al. | 705/14 |
| 2006/0224615 A1 * | 10/2006 | Korn et al. | 707/102 |
| 2006/0282328 A1 * | 12/2006 | Gerace et al. | 705/14 |
| 2007/0150353 A1 * | 6/2007 | Krassner et al. | 705/14 |
| 2007/0156621 A1 * | 7/2007 | Wright et al. | 706/48 |
| 2007/0156887 A1 * | 7/2007 | Wright et al. | 709/224 |
| 2007/0174114 A1 * | 7/2007 | Bigby et al. | 705/14 |
| 2007/0192333 A1 * | 8/2007 | Ali | 707/10 |
| 2007/0214118 A1 * | 9/2007 | Schoen et al. | 707/3 |
| 2007/0214132 A1 * | 9/2007 | Grubb et al. | 707/5 |
| 2008/0104026 A1 * | 5/2008 | Koran | 707/3 |
| 2008/0195462 A1 * | 8/2008 | Magdon-Ismail et al. | 705/10 |
| 2008/0249832 A1 * | 10/2008 | Richardson et al. | 705/10 |
| 2008/0263025 A1 * | 10/2008 | Koran | 707/5 |
| 2008/0270223 A1 * | 10/2008 | Collins et al. | 705/10 |
| 2008/0306824 A1 * | 12/2008 | Parkinson | 705/14 |
| 2008/0306830 A1 * | 12/2008 | Lasa et al. | 705/26 |
| 2009/0012996 A1 * | 1/2009 | Gupta et al. | 707/104.1 |
| 2009/0024718 A1 * | 1/2009 | Anagnostopoulos et al. | 709/218 |
| 2009/0112701 A1 * | 4/2009 | Turpin et al. | 705/10 |
| 2009/0124241 A1 * | 5/2009 | Krishnaswamy et al. | 455/414.2 |
| 2009/0125462 A1 * | 5/2009 | Krishnaswamy et al. | 706/12 |
| 2009/0138362 A1 * | 5/2009 | Schroedl et al. | 705/14 |
| 2009/0228335 A1 * | 9/2009 | Niyogi et al. | 705/10 |
| 2009/0240677 A1 * | 9/2009 | Parekh et al. | 707/5 |
| 2010/0138452 A1 * | 6/2010 | Henkin et al. | 707/803 |
| 2010/0169175 A1 * | 7/2010 | Koran | 705/14.45 |
| 2011/0106729 A1 * | 5/2011 | Billingsley et al. | 705/36 R |
| 2011/0145061 A1 * | 6/2011 | Spurr et al. | 705/14.49 |
| 2014/0025486 A1 * | 1/2014 | Bigby et al. | 705/14.45 |

\* cited by examiner

*Primary Examiner* — Matthew Gart
*Assistant Examiner* — Ashford S Hayles
(74) *Attorney, Agent, or Firm* — Fish & Richardson P.C.

(57) ABSTRACT

Advertisement quality measures (e.g., predicted click through rates) are modified in accordance with a user's preferences with respect to domains to which the advertisements relate.

33 Claims, 6 Drawing Sheets

USER-BASED AD RANKING

CROSS-REFERENCE TO RELATED APPLICATIONS

This application claims the benefit under 35 U.S.C. §119 (e) of U.S. Provisional Patent Application No. 61/046,278, titled "User-Based Ad Ranking," filed Apr. 18, 2008, which is incorporated here by reference.

TECHNICAL FIELD

The subject matter of this patent application is generally related to content presentation.

BACKGROUND

Interactive media (e.g., the Internet) has great potential for improving the targeting of advertisements ("ads") to receptive audiences. For example, some websites provide information search functionality that is based on keywords entered by the user seeking information. The user query can be an indicator of the type of information of interest to the user. By comparing the user query to a list of keywords specified by an advertiser, targeted ads can be provided to the user.

In a conventional Internet advertising model, ads targeted based on query keywords are sent to the user to be presented with search results responsive to the query. Generally, this type of conventional advertising model relies on aggregate user behavior to target ads, such that ad targeting is not specific to the type of user submitting the query. Additionally, this type of conventional advertising model does not vary how targeted ads are presented to the user based on the type of user. For example, for a given query and set of search results, the order or rank of targeted ads on a search result page is typically predetermined regardless of the ad selection behavior of the user. That is, regardless of whether a user never selects ads, often selects ads, or only selects ads from a particular domain, the user's ad service experience is the same as the experience for all other users.

SUMMARY

A technique, method, apparatus, and system are described to provide user-based ad ranking In general, one aspect of the subject matter described in this specification can be embodied in a method that includes the actions of receiving an identifier associated with a user session, the user session occurring on a client device; receiving ads for the user session, each ad having a respective ad quality measure; identifying one or more correction factors for the user session; modifying one or more of the ad quality measures for the ads, wherein an ad quality measure is modified by a respective correction factor; and ranking the ads based at least upon the modified one or more ad quality measures so that when the ads are provided to the client device the ads are presented according to the rank. Other embodiments of this aspect include corresponding methods, apparatus, and computer program products.

Another aspect of the subject matter described in this specification can be embodied in a method that includes receiving information associated with a user of a user session, the user session occurring on a client device, the received information including one or more correction factors for the user session; receiving ads for the user session, each ad having a respective ad quality measure; modifying one or more of the ad quality measures for the ads using the received information; and using at least the modified ad quality measures to rank the one or more ads for presentation according to the rank. Other embodiments of this aspect include corresponding methods, apparatus, and computer program products.

Particular embodiments of the subject matter described in this specification can be implemented to realize one or more of the following advantages. The ranking of ads can be personalized for an individual user to improve the quality of ad service for that individual user. Information about an individual user's preference for particular domains can be collected over a determined time period, for example, with the permission of the user, and used to modify the ranking of ads to personalize ad delivery for the individual user. Personalizing ad ranking takes advantage of information gained from knowing a user's website preferences, which influences the user's interaction with ads from the websites. User-based ad ranking can improve user experience while increasing the likelihood of selection for the presented ads.

The details of one or more embodiments of the subject matter described in this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Techniques, methods, apparatus, and a system for presenting sponsored content (e.g., advertising) are described. In some implementations, the techniques, methods, apparatus, and system can be used to facilitate online advertising occurring over a network, including one or more local area networks (LANs) or a wide area network (WAN), for example, the Internet. Any reference herein to "online advertising" is meant to include any such advertising occurring over a network and is not limited to advertising over the Internet. Further, the techniques and system described can be used to distribute other forms of sponsored content over other distribution media (e.g., not online), including those over broadcast, wireless, radio or other distribution networks. By way of example, the techniques and system are discussed in an online advertising context, but other contexts are possible. For example other forms of content can be delivered other than advertisements.

Figure 1:
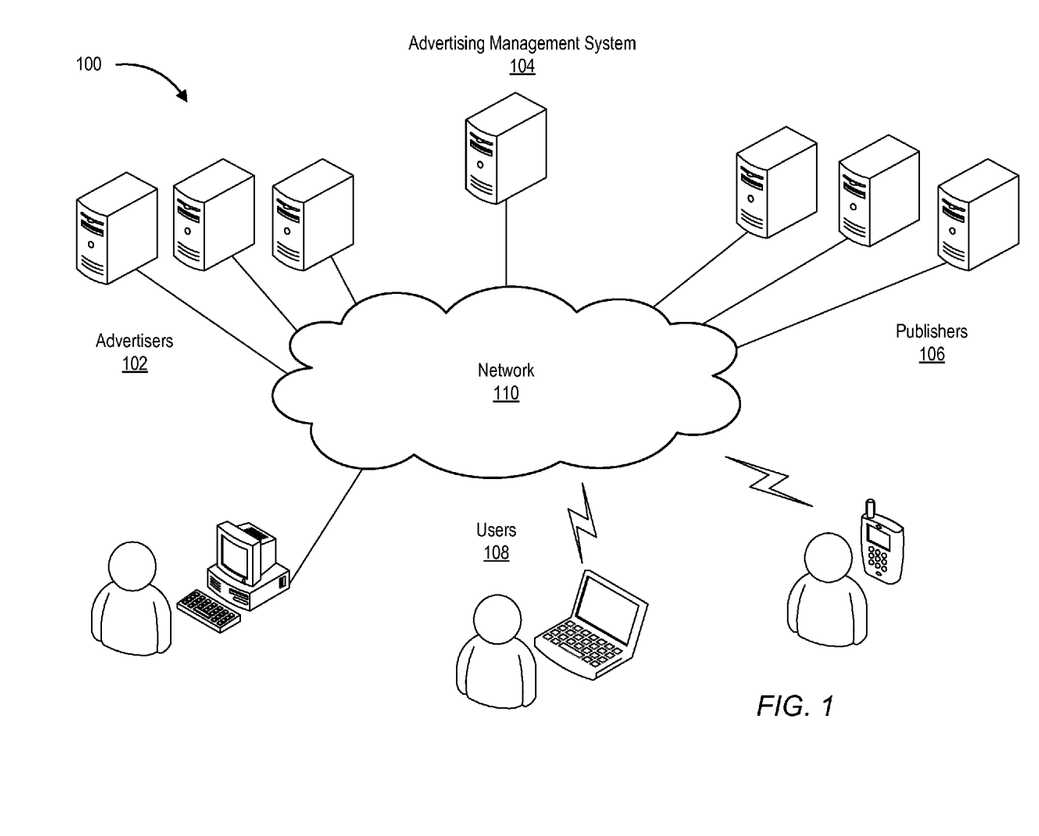
FIG. 1 is a block diagram of an example online advertising system.

FIG. 1 is a block diagram of an example online advertising system 100. In some implementations, one or more advertisers 102 can directly, or indirectly, enter, maintain, and track advertisement ("ad") information in an advertising management system 104. The ads may be in the form of graphical ads, such as banner ads, text only ads, image ads, audio ads, video ads, ads combining one of more of any of such components, etc. The ads may also include embedded information, such as a links, meta-information, and/or machine executable instructions. One or more publishers 106 may submit requests for ads to the system 104. The system 104 responds by sending ads to the requesting publisher 106 for placement on one or more of the publisher's web properties (e.g., websites and other network-distributed content).

Other entities, such as users 108 and the advertisers 102, can provide usage information to the system 104, such as, for example, whether or not a conversion or click-through related to an ad has occurred. This usage information can include measured or observed user behavior related to ads that have been served. The system 104 performs financial transactions, such as crediting the publishers 106 and charging the advertisers 102 based on the usage information.

A computer network 110, such as a local area network (LAN), wide area network (WAN), wireless network, peer-to-peer network, the Internet, or a combination thereof, connects the advertisers 102, the system 104, the publishers 106, and the users 108.

One example of a publisher 106 is a general content server that receives requests for content (e.g., articles, discussion threads, music, video, graphics, search results, web page listings, information feeds, etc.), and retrieves the requested content in response to the request. The content server may submit a request for ads to an ad server in the system 104. The ad request may include a number of ads desired. The ad request may also include content request information. This information can include the content itself (e.g., page or other content document), a category corresponding to the content or the content request (e.g., arts, business, computers, arts-movies, arts-music, etc.), part or all of the content request, content age, content type (e.g., text, graphics, video, audio, mixed media, etc.), geo-location information, etc.

In some implementations, the content server can combine the requested content with one or more of the ads provided by the system 104. This combined content and ads can be sent to the user 108 that requested the content for presentation in a viewer (e.g., a browser or other content display system). The content server can transmit information about the ads back to the ad server, including information describing how, when, and/or where the ads are to be rendered (e.g., in HTML or JavaScript™).

Another example publisher 106 is a search service. A search service can receive queries for search results. In response, the search service can retrieve relevant search results from an index of documents (e.g., from an index of web pages). An exemplary search service is described in the article S. Brin and L. Page, "The Anatomy of a Large-Scale Hypertextual Search Engine," Seventh International World Wide Web Conference, Brisbane, Australia and in U.S. Pat. No. 6,285,999, both of which are incorporated herein by reference each in their entirety. Search results can include, for example, lists of web page titles, snippets of text extracted from those web pages, and hypertext links to those web pages, and may be grouped into a predetermined number of (e.g., ten) search results.

The search service can submit a request for ads to the system 104. The request may include a number of ads desired. This number may depend on the search results, the amount of screen or page space occupied by the search results, the size and shape of the ads, etc. In some implementations, the number of desired ads will be from one to ten, or from three to five.

The request for ads may also include the query (as entered or parsed), information based on the query (such as geo-location information, whether the query came from an affiliate and an identifier of such an affiliate), and/or information associated with, or based on, the search results. Such information may include, for example, identifiers related to the search results (e.g., document identifiers or "docIDs"), scores related to the search results (e.g., information retrieval ("IR") scores), snippets of text extracted from identified documents (e.g., web pages), full text of identified documents, feature vectors of identified documents, etc. In some implementations, IR scores can be computed from, for example, dot products of feature vectors corresponding to a query and a document, page rank scores, and/or combinations of IR scores and page rank scores, etc.

The search service can combine the search results with one or more of the ads provided by the system 104. This combined information can then forwarded to the user 108 that requested the content. The search results can be maintained as distinct from the ads, so as not to confuse the user between paid advertisements and presumably neutral search results.

Finally, the search service can transmit information about the ad and when, where, and/or how the ad was to be rendered back to the system 104.

As can be appreciated from the foregoing, the advertising management system 104 can serve publishers 106, such as content servers and search services. The system 104 permits serving of ads targeted to documents served by content servers. For example, a network or inter-network may include an ad server serving targeted ads in response to requests from a search service with ad spots for sale. Suppose that the inter-network is the World Wide Web. The search service crawls much or all of the content. Some of this content will include ad spots (also referred to as "inventory") available. More specifically, one or more content servers may include one or more documents. Documents may include web pages, email, content, embedded information (e.g., embedded media), meta-information and machine executable instructions, and ad spots available. The ads inserted into ad spots in a document can vary each time the document is served.

Figure 2:
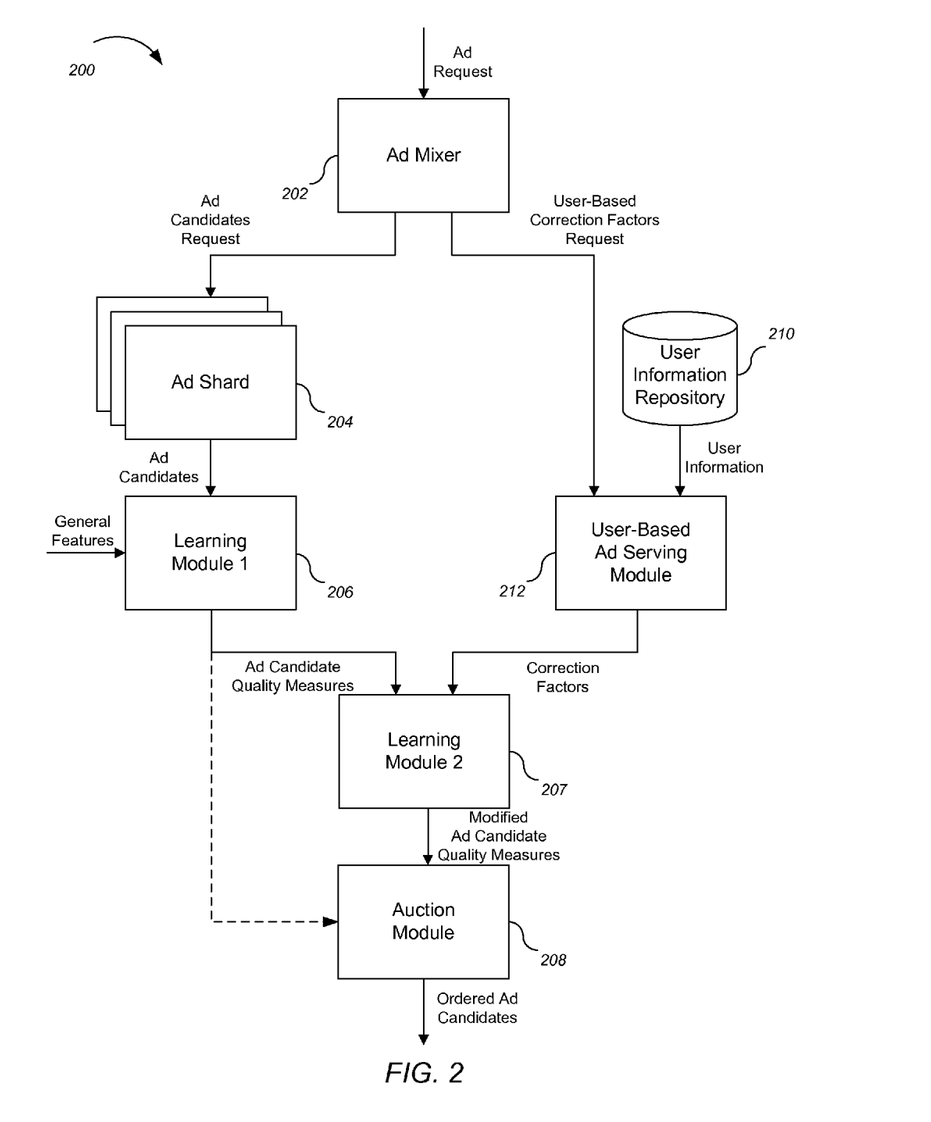
FIG. 2 is a block diagram of an example advertising serving system of the advertising management system of FIG. 1 that provides user-based ad ranking.

FIG. 2 is a block diagram of an example advertising serving system 200 of the advertising management system 104 of FIG. 1 that provides user-based ad ranking. The ad serving system 200 receives an ad request for one or more ads, and provides one or more ordered ad candidates in response to the ad request. In some implementations, the ad request is submitted by a search service in response to a user submitting a query. The ad request can specify a number of ads desired to accompany search results for the user-submitted query. In other implementations, the ad request is submitted by a content server in response to a user's request for content. The ad request can specify a number of ads desired to accompany the content requested by the user. The user can submit the query or request the content during a user session, e.g., using a web browser running on a client device. In some implementations, and with the permission of the user (e.g., by an opt-in service or the like), information about the user session (e.g., an identifier associated with the user session, queries submitted, or ads selected) can be recorded in user session logs.

The ad request is received by an ad mixer 202 in the ad serving system 200. If the ad request is submitted by a search service, the ad request can include the query and information about the query (e.g., time of submission). In response to the ad request, the ad mixer 202 generates an ad candidates request and a user-based correction factors request. The ad candidates request can include the query terms or keywords and the desired number of ads, if specified in the ad request.

The user-based correction factors request can include an identifier associated with the user session, where the user session occurs on a client device. For example, the identifier associated with the user session can be an identifier of the user session, an identifier of the user of the user session, or an identifier of the client device. The user may opt in to allow the collection of user data. In some implementations, user session information that is stored is insufficient to identify an individual user.

One or more ad shards 204 receive the ad candidates request. The one or more ad shards 204 use the query terms or keywords to select one or more ad candidates (e.g., from an ad repository) that are related to the query terms or keywords. In some implementations, an ad candidate selected by an ad shard can exactly "match" a given keyword of the query, for example, if the advertiser of the ad candidate previously specified that the advertiser wants the ad candidate to be presented when a user-submitted query contains the given keyword. In other implementations, an ad candidate may not exactly "match" the given keyword but may still be selected by an ad shard, for example, if the advertiser previously specified that the advertiser wants the ad candidate to be presented when a user-submitted query contains a particular term, where the particular term is similar to (e.g., a synonym of) the given keyword.

The ad candidates are passed from the one or more ad shards 204 to a first learning module 206. The first learning module 206 also receives one or more general features associated with the ad candidates or with the query. In some implementations, the general features include information about the type of ad candidates passed to the first learning module 206 or the type of query submitted by the user. In some implementations, the general features include statistics computed from data logs of previous user sessions, where the same query was submitted by other users or the same ad candidates were presented to and selected by other users. The first learning module 206 can use the general features and a statistical model to estimate the quality of individual ad candidates.

One measure of ad quality is a predicted click through rate (CTR). When a user selects an ad by clicking on it, embedded hypertext links typically direct the viewer to the advertiser's Web site. This process, wherein the user selects an ad, is commonly referred to as a "click-through." The term "click-through" is intended to cover any user selection or interaction. The ratio of the number of click-throughs to the number of impressions of the ad (e.g., the number of times an ad is displayed) is commonly referred to as the "click-through rate" of the ad. The number of expected ad click-throughs for a given ad can be calculated using the predicted CTR for the given ad. In some implementations, the first learning module 206 generates a predicted CTR as a quality measure for each ad candidate it receives from the one or more ad shards 204. Techniques for estimating ad quality using machine learning systems are described in U.S. Patent Publication No. 2007/0156887 A1, filed Dec. 30, 2005, for "Predicting Ad Quality," which is incorporated by reference herein in its entirety.

The first learning module 206 generates quality measures for the ad candidates without consideration of user information of the user associated with the ad request, e.g., user ad selection behavior of the user. The quality measure for an ad candidate is typically based on aggregate performance of the ad candidate for all users. The ad quality measures are used to determine which ad candidates are selected and how the selected ads are ranked when presented to the user.

The ad candidate quality measures can be modified based on information associated with the user (e.g., from user session information) to provide the user with personalized ad ranking. In some implementations, information about the user's preferences (e.g., as indicated by the user's ad selection behavior) can be used to tailor ad ranking for the user. For example, the ad candidate quality measures (e.g., CTR predictions) can be passed from the first learning module 206 to a second learning module 207. The second learning module 207 can apply correction factors that are based on information associated with the user. These correction factors can be used to modify the ad candidate quality measures.

User-based ad ranking can be optional for a user, i.e., the user can opt-in or opt-out of user-based ad ranking. If a user opts out of user-based ad ranking, the ad candidates are ranked using the ad candidate quality measures based on the aggregate performance of the ads across all or a large number of users. If a user opts in to user-based ad ranking, the ad candidates are ranked using the ad candidate quality measures modified by correction factors based on information associated with the user. In some implementations, user identifiers and other user information can be anonymized to protect the user's identity.

In some implementations, when a user opts out of user-based ad ranking, the ad candidate quality measures generated by the first learning module 206 are passed to an auction module 208, as indicated by the dashed line in FIG. 2. The auction module 208 determines the best predetermined number of candidate ads to present to the user and the order in which to present the candidate ads based on the quality measures (e.g., CTR predictions) and target bids (e.g., specified by advertisers) for all the candidate ads. In some implementations, the predetermined number of candidate ads to be presented is the number of desired ads specified in the ad request sent to the ad serving system 200. The ordered ad candidates can be passed from the auction module 208 to a positioning module (not shown) for generating instructions for determining how the ordered candidate ads are to be provided (e.g., to a client device) for display to the user.

In some implementations, when a user opts in to user-based ad ranking, the ad candidate quality measures generated by the first learning module 206 are passed to the second learning module 207, which can apply correction factors based on anonymized information associated with the user. In some implementations, while the ad service system 200 generates ad candidates and ad candidate quality measures, the system 200 generates, in parallel or substantially in parallel, one or more correction factors. Each correction factor modifies the ad quality measure of one or more ad candidates. Determination of the correction factors is described in more detail with respect to FIGS. 3-5. Generating the correction factors in parallel with the ad candidates can prevent or minimize latency added to the ad serving process due to consideration of user-based information for personalizing ad ranking.

As discussed above, the ad mixer 202 generates a user-based correction factors request, which can include an identifier associated with the user session in which the user submitted the query. In some implementations, the identifier identifies the user who submitted the query, e.g., using user login data provided to the search service. In other implementations, the identifier identifies the client device (e.g., a laptop or a mobile phone) used by the user to submit the query. A client device identifier can be, for example, a cookie or an Internet Protocol (IP) address. In other implementations, the identifier identifies the user session.

In some implementations, if a user opts in to user-based ad ranking, correction factors are generated using information associated with the user. A user-based correction factors request is sent from the ad mixer 202 to a user-based ad serving module 212. The user-based ad serving module 212 receives user information which is used to generate one or more correction factors. The user-based ad serving module 212 can use the identifier associated with the user session to retrieve or compute user information for personalizing ad ranking. For example, if the identifier associated with the user session is a user identifier, the user identifier can be used to index into a user information repository 210 to retrieve information specific to the user. The user information can include data gathered from, for example, logs of the user's internet activity over a determined period of time. In some implementations, different gathering periods can be used for different types of user information. In some implementations, user information can include data gathered from a toolbar application of the user's browser running on the client device.

In some implementations, information about the ads presented to the user during a determined time period is retrieved from the user information repository 210. This information can also indicate which of the presented ads were selected and which of the presented ads were not selected (e.g., ignored) by the user. In some implementations, the user-based ad serving module 212 computes one or more user statistics based on user information retrieved from the user information repository 210. For example, to compute an actual CTR of ads presented to the user in a determined time period T, the user-based ad serving module 212 can calculate the ratio of the number of ad clicks (i.e., interactions) by the user during the time period T to the number of ad impressions received by the user during the same time period T, where both numbers are retrieved from the user information repository 210. This actual CTR for a particular user can be compared to the predicted CTR as an indication of whether the particular user liked the ads presented to the user.

In some implementations, user information or user statistics can be specific to one or more domains, where the domain of an ad is the domain name component of the ad's visible Uniform Resource Locator (URL) address. For example, the number of ad clicks by the user during a determined time period can be domain-specific. That is, the domain-specific number of ad clicks is the number of ad clicks by the user of ads having the particular domain, where the ads are presented to the user during the determined time period. Likewise, the number of ad impressions, CTR (actual and predicted), and other user ad selection behavior information can be stored, retrieved, or computed for one or more particular domains.

In some implementations, higher-level per-user data are also collected for influencing the ranking processes. An example of higher-level per-user data is ad impression context data, such as the local time of day of the user's query submission, the day of the week of the user's query submission, the language of the user's query submission, the user's time zone, the user's city or region, or the user's country. This higher-level data can be useful when other per-user data is statistically unreliable, for example, when the other per-user data is especially noisy, or when few data points have been collected for a new user.

Using the retrieved user information and/or computed user statistics, the user-based ad serving module 212 can determine one or more correction factors. A correction factor can be associated with one or more domains, e.g., the one or more domains in a partition (described in more detail below). Thus, a correction factor can be domain-specific or can apply to multiple domains. A correction factor associated with an ad is the correction factor that applies to the domain of the ad. For example, if a particular correction factor is domain-specific, the quality measure for an ad having the specific domain can be modified by the particular correction factor. Alternatively, if a particular correction factor applies to multiple domains in a partition, any ad having a domain included in the partition can have its quality measure modified by the particular correction factor. Determination of the correction factors is described in more detail below.

The second learning module 207 receives as input the ad candidate quality measures from the first learning module 206 and the correction factors from the user-based ad serving module 212. For a particular ad candidate, the second learning module 207 can apply a correction factor associated with the particular ad candidate to the quality measure (e.g., predicted CTR) for the ad candidate to produce a modified quality measure (e.g., a modified predicted CTR) for the ad candidate.

The second learning module 207 outputs the modified ad candidate quality measures to the auction module 208. For ad candidates which are not associated with a correction factor, the second learning module 207 also passes to the auction module 208 the unmodified ad candidate quality measures (e.g., the ad candidate quality measures generated by the first learning module 206). The auction module 208 determines the best predetermined number of candidate ads to present to the user and the order in which to present the candidate ads using at least the modified quality measures for candidate ads associated with correction factors and the unmodified quality measures for candidate ads that are not associated with correction factors. In some implementations, the auction module 208 determines the order in which to present the candidate ads based on the modified and unmodified quality measures for candidate ads and on the target bids (e.g., specified by advertisers) for all the candidate ads.

Figure 3:
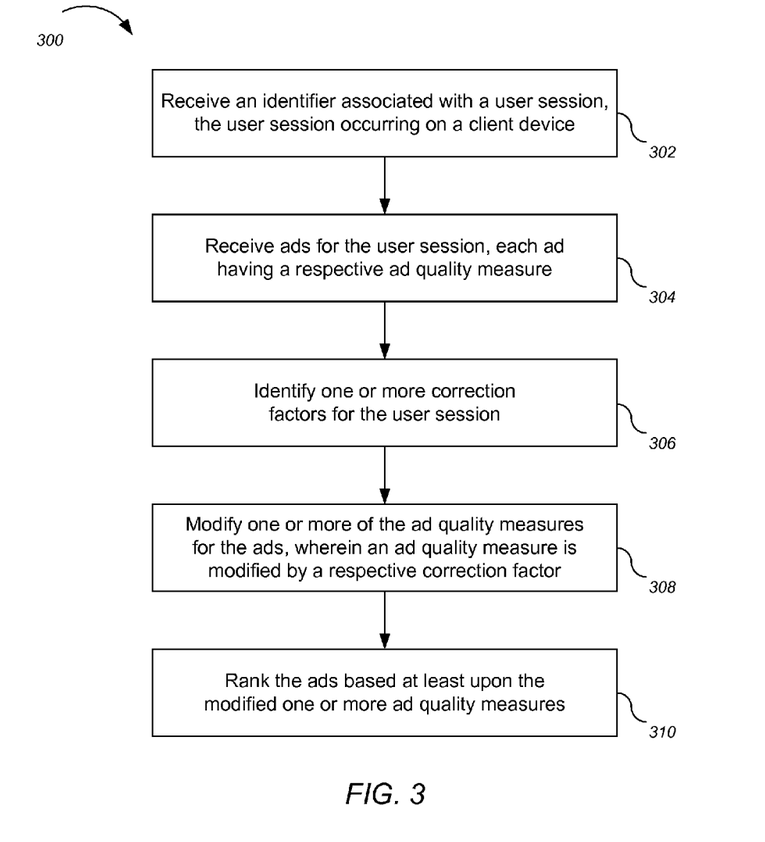
FIG. 3 is a flow diagram of an example process for ranking ads based on ad quality measures modified by correction factors for a user session.

FIG. 3 is a flow diagram of an example process 300 for ranking ads based on ad quality measures modified by correction factors for a user session. For convenience, the process 300 will be described with reference to the ad serving system 200 of FIG. 2, which can perform the process. The example process 300 and example processes 400 and 500 of FIGS. 4 and 5, respectively, provide user-based ad ranking. In some implementations, the user can opt-in or opt-out of user-based ad ranking. User information can also be anonymized to further protect the user's identity.

An identifier associated with a user session is received, where the user session occurs on a client device (302). For example, the identifier can be received by the user-based ad serving module 212. In some implementations, the identifier associated with the user session is a user identifier for a user. Ads for the user session are received, where each ad has a respective ad quality measure (304). For example, ad candidates for the user session can be received by the first learning module 206, which can output a predicted CTR for each ad candidate. The ads received in step 304 are ad candidates, which can be used to serve an ad request submitted in response to the user's current query or the user's current request for content in the user session.

One or more correction factors are identified for the user session (306). The correction factors can be identified by the user-based ad serving module 212. Each correction factor can be associated with one or more ads. The ads associated with a particular correction factor can have the same or different domains. In some implementations, at least one of the correction factors for the user session is domain-specific. That is, a domain-specific correction factor is only associated with the ads that have the specific domain. Ads that have different domains are either associated with different correction factors or are not associated with any correction factors.

One or more of the ad quality measures for the ads are modified (308). For example, ad candidate quality measures can be modified by the second learning module 207. A quality measure for a particular ad is modified by the respective correction factor associated with the particular ad. In some implementations, the ad quality measure for an ad is the predicted CTR of the ad.

The ads are ranked based at least upon the modified one or more ad quality measures (310). When the ads are provided to the client device, the ads are presented according to the rank. Ranking of ad candidates can be performed by the auction module 208. In some implementations, the ads are ranked based at least upon the modified ad quality measures for some ads, which are associated with correction factors, and unmodified ad quality measures for other ads, which are not associated with correction factors.

In some implementations, the user's preferences for one or more domains can be determined. A user preference for a particular domain can indicate that the user prefers the particular domain relative to other domains, e.g., selects ads that lead to that preferred domain more often than ads that lead to other domains. Alternatively, the user preference for a particular domain can indicate that the user does not prefer (e.g., dislikes or evidences no preference for) the particular domain relative to other domains.

User preference for a particular domain can be determined based, for example, on user selection behavior of ads having the particular domain. For example, if a user always or almost always selects an ad having the domain "i_love_cheap_video_games.com" while only selecting ads having other domains 50% of the time, the ad serving system 200 can determine that the user prefers the "i_love_cheap_video_games.com" domain relative to the other domains. Likewise, if the same user ignores or rarely selects ads having the domain "gardening_is_my_hobby.com," the ad serving system 200 can determine that the user does not prefer that domain relative to other domains.

When user preferences for domains are determined, the correction factors for a user session can be based on the user preferences. For example, if the quality measure for an ad is the predicted CTR of the ad, the correction factor for an ad having a preferred domain can increase the predicted CTR of the ad relative to the predicted CTR of an ad having a non-preferred (e.g., disliked or ignored) domain. If an ad has a non-preferred domain, the correction factor for the ad can decrease the predicted CTR of the ad relative to the predicted CTR of an ad having a preferred domain. In some implementations, only correction factors for preferred domains or correction factors for non-preferred domains are identified. For other implementations, both types of correction factors are identified.

After one or more of the quality measures for the ads are adjusted, the ads can be auctioned. The auction results, which are based, in part, on the quality measures, will thus reflect the user's preferences. In some implementations, the auction results are also based on, for example, the target bids for the candidate ads.

Figure 4:
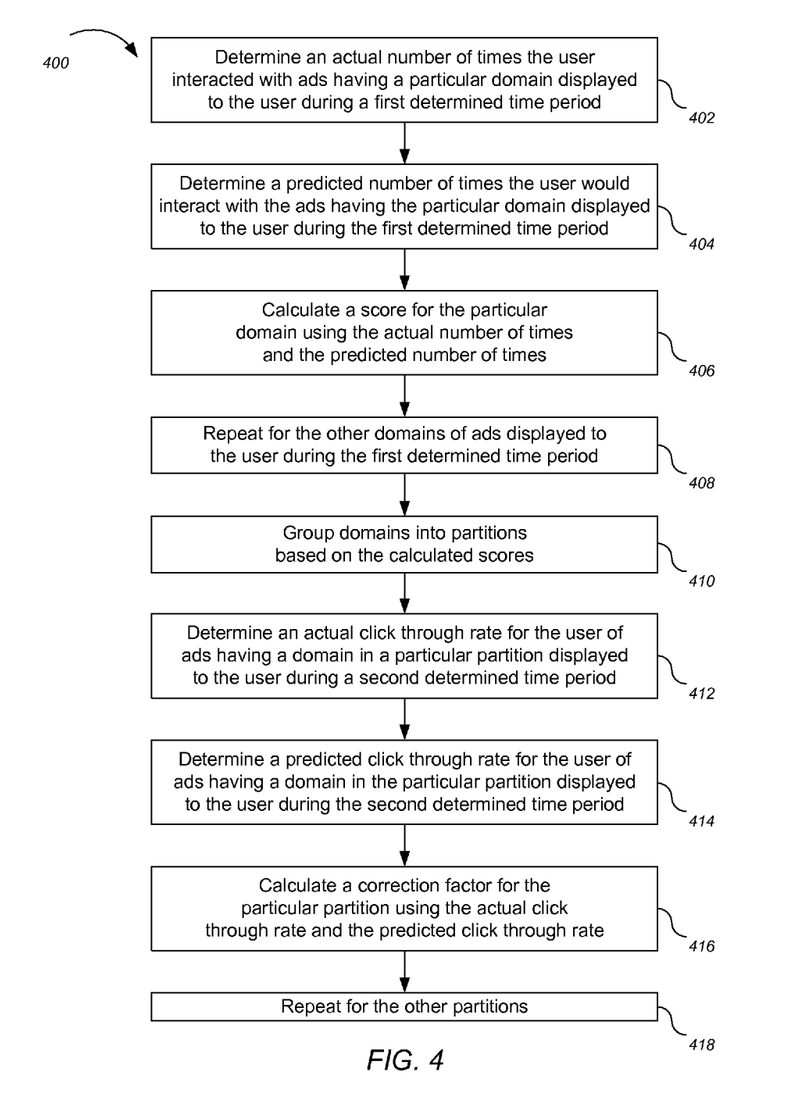
FIG. 4 is a flow diagram of an example process for determining user preferences for domains and calculating correction factors for modifying ad quality measures.

FIG. 4 is a flow diagram of an example process 400 for determining user preferences for domains and for calculating correction factors for modifying ad quality measures. For convenience, the process 400 will be described with reference to the ad serving system 200 of FIG. 2, which can perform the process.

An actual number of times the user interacted with (i.e., selected) ads having a particular domain is determined, where the ads having the particular domain are displayed to the user during a first determined time period (402). For example, the user-based ad serving module 212 can determine the actual number of times the user selected the ads. In some implementations, the first determined time period is a training period (e.g., 7, 14, or 28 days) for determining the domains the user prefers and/or the domains the user does not prefer.

Based on the predicted CTRs of the ads having the particular domain that are displayed to the user during the first determined time period, a predicted number of times the user would interact with (i.e., select) the ads having the particular domain can be determined (404). The user-based ad serving module 212 can determine the predicted number of times the user would select the ads. The predicted CTRs for each ad can be based on aggregate performance of the ad for all users.

A score for the particular domain is calculated using the determined actual number of times and the determined predicted number of times (406). For example, the score can be calculated by the user-based ad serving module 212 from user information retrieved from the user information repository 210. In some implementations, the score can be based on the difference between the determined actual number of times and the determined predicted number of times. For example, the score can be the magnitude of the difference or a logarithm of the difference. The score for a particular domain measures for this user the accuracy or the inaccuracy of the estimates of click-throughs for the displayed ads having the particular domain.

Steps 402 through 406 are repeated for the other domains of ads displayed to the user during the first determined time period (408). As a result, each domain of the ads has a respective calculated score.

The domains of ads displayed to the user during the first determined time period are grouped into partitions based on the calculated scores (410). For example, the domains can be grouped by the user-based ad serving module 212. The number of partitions and the segmentation points of the partitions can be selected to optimize confidence in the prediction of user preferences and can be based on the amount of data available and/or the calculated scores.

In some implementations, a particular domain is grouped into a partition only if at least a minimum number of ads (e.g., two ads) having the particular domain were displayed to the user during the first determined time period. This optional filtering step helps to ensure confidence in the determination of user preferences.

In some implementations, the domains are ordered according to the calculated scores, and only the top N domains are grouped into partitions. The top N domains can represent, for example, the most preferred domains or the most ignored domains. The number of grouped domains N can be determined, for example, based on the available data storage capacity for storing the list of domains and the respective scores for each user. In some implementations, the list of domains and the partitioning of the domains can be updated daily based on user session logs.

An actual CTR of ads having a domain in a particular partition is determined for the user, where the ads having a domain in the particular partition are displayed to the user during a second determined time period (412). For example, the actual CTR can be determined by the user-based ad serving module 212. In some implementations, the second determined time period is a test period (e.g., 12, 24, or 48 hours) for determining correction factors for the grouped domains. The length of the second determined time period can be adjusted for predictive confidence.

In some implementations, the actual CTR is determined for the user by taking the ratio of the number of clicks by the user of ads having a domain in the particular partition to the number of impressions of ads having a domain in the particular partition. In other implementations, the actual CTR is calculated as an average of the individual CTRs for the ads having a domain in the particular partition displayed to the user during the second determined time period.

A predicted CTR of ads having a domain in the particular partition is determined for the user, where the ads having a domain in the particular partition are displayed to the user during the second determined time period (414). The user-based ad serving module 212 can determine the predicted CTR. In some implementations, the predicted CTR is determined by taking the ratio of the predicted number of clicks to the number of impressions. In other implementations, the predicted CTR is calculated as an average of the individual predicted CTRs for the ads.

A correction factor for the particular partition is calculated using the determined actual CTR and the determined predicted CTR (416). The correction factor can be calculated by the user-based ad serving module 212. For example, the correction factor can be the ratio of the actual CTR to the predicted CTR. In some implementations, the correction factor for the particular partition is calculated using an actual number of times the user selected ads having a domain in the particular partition and a predicted number of times the user would select ads having a domain in the particular partition.

Steps 412 through 416 are repeated for the other partitions (418). As a result, each partition has a respective correction factor.

In some implementations, an ad quality measure for an ad is modified by determining that the domain of the ad is in a particular partition and by applying the correction factor for the particular partition to the ad quality measure for the ad. For example, the second learning module 207 can apply the respective correction factor to all ad candidates having domains in the particular partition. When the ad quality measure is predicted CTR, application of the correction factor to the predicted CTR is intended to adjust the predicted CTR to approximately the actual CTR for the particular user. The more a user prefers or does not prefer (e.g., dislikes) a particular domain, the larger the adjustment needed to correct the predicted CTR.

In some scenarios, the domain of a particular ad may not be included in any of the partitions. For example, the particular ad may be the first ad to be presented to the user having the given domain. In some implementations, the domain of the particular ad can be determined as similar to at least one domain in a particular partition. In these implementations, the ad quality measure for the particular ad can be modified by applying the correction factor for the particular partition.

The domain of the particular ad can be determined as similar to a domain in a particular partition if, for example, the domain of the ad has a common vertical with the domain in the particular partition. Verticals can represent, for example, industries or broad topics at a high level of a taxonomy system which includes concepts, themes, or categories. Some examples of verticals are travel, entertainment, electronics, and education. For example, if the user prefers ads from a first online travel search site but has never received impressions of ads from a second online travel search site, the predicted CTRs for ads from the second online travel search site can be modified with the same correction factor that would apply to the predicted CTRs for ads from the first online travel search site.

In some implementations, domains are determined as being similar if the sites of the domains have a similar size. For example, a user who ignores ads from the domains of chain department stores might also ignore ads from the domains of chain hotels.

In some implementations, domains are determined as being similar based on collaborative filtering. Collaborative filtering can be used to group similar domains by collecting information about user domain preferences across all or a large number of users. The collected information can be used to find correlation or consensus in user behavior that suggests domain preference trends. Collaborative filtering is based on the premise that users who behaved similarly in the past are likely to behave similarly in the future. As an example, user session data might reveal that users who prefer ads having a first domain also prefer ads having a second domain. As a result, the ad serving system 200 can determine that the two domains are similar enough to share a common correction factor. In some implementations, collaborative filtering can be used to determine groups by verticals or other categories.

Figure 5:
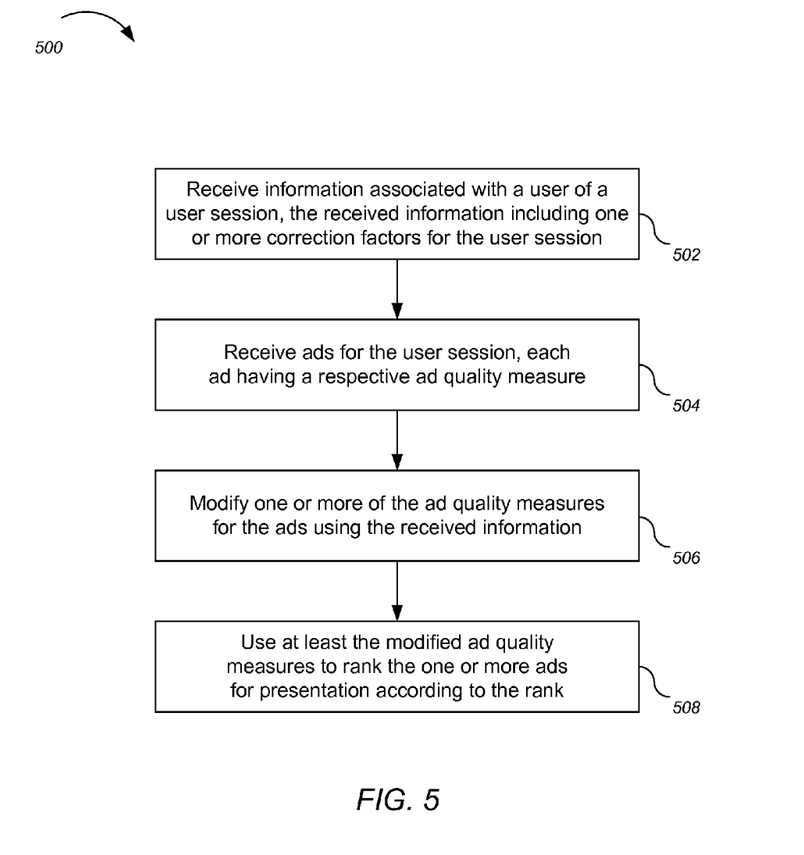
FIG. 5 is a flow diagram of an example process for modifying ad quality measures using information associated with a user.

FIG. 5 is a flow diagram of an example process 500 for modifying ad quality measures using information associated with a user. For convenience, the process 500 will be described with reference to the ad serving system 200 of FIG. 2, which can perform the process.

Information associated with a user of a user session is received, where the received information includes one or more correction factors for the user session (502). For example, the information can be received by the second learning module 207 from the user-based ad serving module 212. In some implementations, the user's preferences for one or more domains are determined. Information associated with the user's preferences can be included in the received information.

Ads for the user session are received, where each ad has a respective ad quality measure (504). The ad quality measure (e.g., predicted CTR) for each ad candidate can be computed by the first learning module 206 and received by the second learning module 207.

One or more of the ad quality measures for the ads are modified using the received information (506). For example, the second learning module 207 can modify the ad quality measures. In some implementations, the particular user is determined as being similar to other users in a group. As an example, if insufficient user information exists for the particular user, the user's preferences for particular domains can be predicted based on the other users' preferences for the particular domains. Information associated with the predicted user's preferences can be included in the received information and used to modify one or more of the ad quality measures for the ads.

In one example, the user can be determined as similar to other users in the group based on similarity between the ad selection behavior of the user and the ad selection behavior of the other users in the group. For example, if users in the group ignore domains A, B, and C and a particular user ignores domains A and B but has never received impressions of ads having domain C, it can be inferred that the particular user will also ignore ads having domain C. This similarity in ad selection behavior between the particular user and the other users in the group can be used to predict the particular user's preference.

In some implementations, similarity in other user behavior (e.g., users' past query submissions or users' interaction with search results of a particular domain) is used to group users. For example, collaborative filtering can be used to detect how users in a group might prefer or not prefer ads having a domain X given that the users previously selected (or, alternatively, did not select when receiving an impression) ads and/or search results of a domain Y, where X and Y may or may not be the same domain. In some implementations, collaborative filtering can be used to determine user groups by user language, country, demographic, etc.

At least the modified ad quality measures are used to rank the one or more ads for presentation according to the rank (508). The ranking of the ads can be determined, for example, by the auction module 208.

Figure 6:
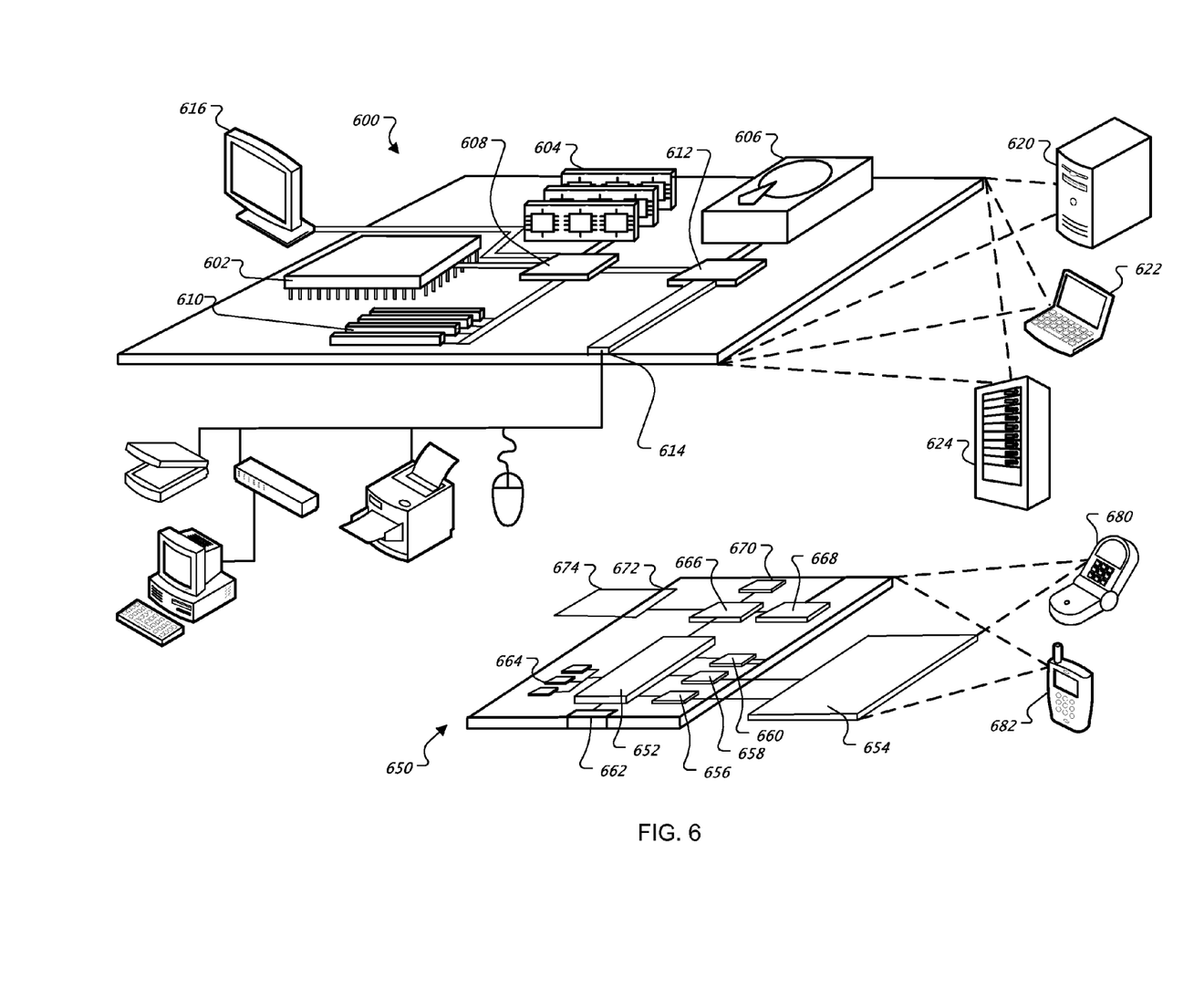
FIG. 6 is a block diagram of generic computing devices.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a computer-readable medium. In one implementation, the memory 604 is a volatile memory unit or units. In another implementation, the memory 604 is a non-volatile memory unit or units.

The storage device 606 is capable of providing mass storage for the computing device 600. In one implementation, the storage device 606 is a computer-readable medium. In various different implementations, the storage device 606 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 604, the storage device 606, memory on processor 602, or a propagated signal.

The high speed controller 608 manages bandwidth-intensive operations for the computing device 600, while the low speed controller 612 manages lower bandwidth-intensive operations. Such allocation of duties is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can process instructions for execution within the computing device 650, including instructions stored in the memory 664. The processor may also include separate analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD display or an OLED display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication (e.g., via a docking procedure) or for wireless communication (e.g., via Bluetooth or other such technologies).

The memory 664 stores information within the computing device 650. In one implementation, the memory 664 is a computer-readable medium. In one implementation, the memory 664 is a volatile memory unit or units. In another implementation, the memory 664 is a non-volatile memory unit or units. Expansion memory 674 may also be provided and connected to device 650 through expansion interface 672, which may include, for example, a SIMM card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS receiver module 670 may provide additional wireless data to device 650, which may be used as appropriate by applications running on device 650.

Device 650 may also communication audibly using audio codec 660, which may receive spoken information from a user and convert it to usable digital information. Audio codex 660 may likewise generate audible sound for a user, such as through a speaker, e.g., in a handset of device 650. Such sound may include sound from voice telephone calls, may include recorded sound (e.g., voice messages, music files, etc.), and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

The features described can be implemented in digital electronic circuitry, or in computer hardware, firmware, software, or in combinations of them. The features can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. In some implementations, user-based ad ranking occurs at a different stage in the ad serving pipeline. For example, user-based ad ranking can occur at the time ads are ordered or at the time ads are displayed to the user. In some implementations, correction factors for ads targeted to a particular user depend in part on profiles or information associated with other users. Accordingly, other implementations are within the scope of the following claims.

What is claimed is:

1. A method comprising:
receiving, by one or more computers, an identifier associated with a user session, the user session occurring on a client device;
receiving ads for the user session, each ad having a respective ad quality measure;
determining, by one or more computers, one or more correction factors for the user session, each correction factor specifying, for ads that link to a particular domain, a value by which the ad quality measures for the ads that link to the particular domain are to be modified, the value of each correction factor being based on a difference between a non-zero predicted click through rate for the ads that link to the particular domain when presented during user sessions that are associated with the identifier, and an actual click through rate for the ads that link to the particular domain when presented during user sessions that are associated with the identifier, the predicted click through rate being based on an aggregate performance of the ads that link to the particular domain for multiple users;
modifying, by one or more computers and for a particular ad from the received ads, the ad quality measure for the particular ad to generate a modified ad quality measure for the particular ad, the modification being based on a function of the ad quality measure for the particular ad and the correction factor that was determined for the particular domain to which the particular ad is linked; and
ranking, by one or more computers, the ads based at least upon the modified ad quality measure for the particular ad so that when the ads are provided to the client device the ads are presented according to the rank.

2. The method of claim 1, wherein the identifier is a user identifier for a user and the correction factor for each domain to which the ads link is based on a user preference measure for the user and the domain, the user preference measure for the user and the domain being indicative of a preference of the user for the domain.

3. The method of claim 2, wherein:
the ad quality measure for an ad is a predicted click through rate of the ad;
determining one or more correction factors comprises determining, for each domain to which the ads link, whether the domain is a preferred domain or a non-preferred domain based on the user preference measure for the user and the domain; and
the correction factor for an ad that links to a preferred domain increases modified ad quality measure for the ad relative to the modified ad quality measure for an ad that links to a non-preferred domain.

4. The method of claim 1, wherein determining one or more correction factors for the user session further comprises:
for each domain to which the received ads link:
determining an actual number of times a user associated with the identifier interacted with ads that link to the domain displayed to the user during a first determined time period;
determining a predicted number of times the user would interact with the ads that link to the domain displayed to the user during the first determined time period based on predicted click through rates of the ads; and
calculating a score for the domain using the determined actual number of times and the determined predicted number of times.

5. The method of claim 4, further comprising:
grouping the domains to which the ads link into partitions based on the calculated scores; and
determining the correction factor for each partition.

6. The method of claim 5, wherein determining the correction factor for a particular partition further comprises:
determining an actual click through rate for the user of ads that link to a domain in the particular partition displayed to the user during a second determined time period;
determining a predicted click through rate for the user of ads that link to a domain in the particular partition displayed to the user during the second determined time period; and
calculating the correction factor for the particular partition using the determined actual click through rate and the determined predicted click through rate.

7. The method of claim 6, wherein modifying, by one or more computers and for a particular ad from the received ads, the ad quality measure for the particular ad to generate a modified ad quality measure for the particular ad further comprises:
determining that a domain of the particular ad is in a particular partition; and
applying the correction factor for the particular partition to the ad quality measure for the particular ad for the user.

8. A method comprising:
receiving, by one or more computers, information associated with a user of a user session, the user session occurring on a client device, the received information including one or more correction factors for the user session, each correction factor specifying, for ads that link to a particular domain, a value by which ad quality measures for the ads that link to the particular domain are to be modified, the value of each correction factor being based on a difference between a non-zero predicted click-through rate for the ads that link to the particular domain when presented during user sessions that are associated with the identifier user and an actual click-through rate for the ads that link to the particular domain when presented during user sessions that are associated with the user, the predicted click through rate being based on an aggregate performance of the ads that link to the particular domain for multiple users;
receiving, by one or more computers, ads for the user session, each ad having a respective ad quality measure;
modifying, by one or more computers and for a particular ad from the received ads, the ad quality measure for one of the particular ad to generate a modified ad quality measure for the particular ad, the modification being based on a function of the ad quality measure for the particular ad and the correction factor that was received for the particular domain to which the particular as is linked; and
using, by one or more computers, at least the modified ad quality measure to rank the one or more ads for presentation according to the rank.

9. The method of claim 8, wherein using at least the modified ad quality measure to rank the one or more ads comprises:
using at least the modified ad quality measure and unmodified ad quality measures to rank the one or more ads.

10. The method of claim 8, wherein the received information is associated with the user through an identifier of the user session, an identifier of the user, or an identifier of the client device.

11. The method of claim 8, further comprising:
determining a user preference measure for each of one or more domains, the user preference measure for each domain being indicative of a preference of the user for the domain, wherein information associated with preferences of the user is included in the received information, and wherein the user preference measure for at least one domain linked to by the particular ad is used to modify the ad quality measure for the particular ad.

12. The method of claim 11, wherein determining the user preference measure for one of the domains includes determining that the user preferred or ignored the one domain during a determined time period.

13. The method of claim 12, wherein
the ad quality measure for the particular ad is a predicted click through rate of the particular ad; and
modifying, by one or more computers and for a particular ad from the received, the ad quality measure for the particular ad to generate a modified ad quality measure for the particular ad includes increasing the predicted click through rate of the particular ad if a domain linked to by the particular ad was preferred by the user and decreasing the predicted click through rate of the particular ad if the domain linked to by the particular ad was ignored by the user.

14. The method of claim 11, wherein the user preference measure for each of the one or more domains is based on the user's selection behavior of ads that link to the domain.

15. The method of claim 14, wherein determining the user preference measure for each of the one or more domains further comprises:
for each of the one or more domains:
determining an actual number of times the user selected ads that link to the domain displayed to the user during a first determined time period;
determining a predicted number of times the user would select the ads that link to the domain displayed to the user during the first determined time period based on predicted click through rates of the ads; and
calculating a score for the domain based on the difference between the determined actual number of times and the determined predicted number of times.

16. The method of claim 15, further comprising:
grouping the one or more domains into partitions based on the calculated scores; and
determining the correction factor for each partition.

17. The method of claim 16, wherein one of the one or more domains is grouped into a partition only if at least a minimum number of ads that link to the one domain were displayed to the user during the first determined time period.

18. The method of claim 16, wherein determining the correction factor for a particular partition further comprises:
determining an actual click through rate for the user of ads that link to a domain in the particular partition displayed to the user during a second determined time period;
determining a predicted click through rate for the user of ads that link to a domain in the particular partition displayed to the user during the second determined time period; and
calculating the correction factor for the particular partition using the determined actual click through rate and the determined predicted click through rate.

19. The method of claim 16, wherein modifying, by one or more computers and for a particular ad from the received ads, the ad quality measure for the particular ad to generate a modified ad quality measure for the particular ad further comprises:
determining that a domain of the particular ad is in a particular partition; and
applying the correction factor for the particular partition to the ad quality measure for the particular ad for the user.

20. The method of claim 16, wherein modifying, by one or more computers and for a particular ad from the received ads, the ad quality measure for the particular ad to generate a modified ad quality measure for the particular ad further comprises:
determining that a domain of the particular ad is similar to at least one domain in a particular partition; and
applying the correction factor for the particular partition to the ad quality measure for the particular ad for the user.

21. The method of claim 20, wherein determining that the domain of the particular ad is similar to at least one domain in the particular partition is based on one or more of collaborative filtering, the domain of the particular ad having a common vertical with the at least one domain in the particular partition, or a site of the domain of the particular ad having a similar size as a site of the at least one domain in the particular partition.

22. The method of claim 8, further comprising:
determining that the user is similar to other users in a group; and
predicting preferences of the user for one or more domains based on preferences of the other users for the one or more domains, wherein information associated with the predicted user's preferences is included in the received information and used to modify the ad quality measure for the particular ad.

23. The method of claim 22, wherein determining that the user is similar to other users in the group is based on similarity between ad selection behavior of the user and ad selection behavior of the other users in the group.

24. The method of claim 8, wherein the information associated with the user is received and the modified ad quality measure for the particular ad is used when the user provides permission for the information to be received and the modified ad quality measure for the particular ad to be used.

25. A non-transitory computer-readable medium having instructions stored thereon, which, when executed, cause one or more processors to perform operations comprising:
receiving an identifier associated with a user session, the user session occurring on a client device;
receiving ads for the user session, each ad having a respective predicted click through rate;
determining one or more correction factors for the user session, each correction factor associated with one or more domains and specifying, for ads that link to the one or more domains, a value by which the predicted click through rate for the ads that link to the one or more domains are to be modified, the value of each correction factor being based on a difference between a non-zero predicted click through rate for the ads that link to the one or more domains when presented during user sessions that are associated with the identifier and an actual click through rate for the ads that link to the one or more domains when presented during user sessions that are associated with the identifier, the predicted click through rate being based on an aggregate performance of the ads that link to the one or more domains for multiple users;
modifying the predicted click through rate for a particular ad from the received ads to generate a modified predicted click through rate for the particular ad, the modification being based on a function of the predicted click through rate for the particular ad and the correction factor associated with the domain of the particular ad; and ranking the ads based at least upon the modified predicted click through rate so that when the ads are provided to the client device the ads are presented according to the rank.

26. The non-transitory computer-readable medium of claim 25, wherein the identifier is a user identifier for a user, and wherein the instructions, when executed, cause the one or more processors to perform further operations comprising:
   determining a user preference measure for each of a plurality of domains, the user preference measure for each domain being determined by calculating a score for the domain based on a selection behavior of the user for ads that link to the domain displayed to the user during a first determined time period.

27. The non-transitory computer-readable medium of claim 26, further comprising:
   grouping the plurality of domains into partitions based on the calculated scores for the domains; and
   determining a correction factor for each partition, the correction factor associated with one or more domains in the particular partition, wherein the correction factor is determined using the user's selection behavior for ads that link to a domain in the particular partition displayed to the user during a second determined time period.

28. The non-transitory computer-readable medium of claim 27, wherein modifying a respective predicted click through rate for a particular ad from the received ads to generate a modified predicted click through rate for the particular ad further comprises:
   determining that a domain of the particular ad is in a particular partition; and
   applying the correction factor for the particular partition to the respective predicted click through rate for the particular ad for the user.

29. The method of claim 1, wherein the predicted click through rate for the ads that link to a particular domain is based, in part, on past performance of the ads when presented during user sessions that are associated with other user identifiers that are associated with different user sessions.

30. The method of claim 1, wherein each particular domain comprises a domain name component of a resource location address for at least one of the received ads.

31. The method of claim 1, wherein the value of each correction factor is proportional to a ratio between the actual click through rate for ads that link to the particular domain when presented during user sessions that are associated with the user and the predicted click through rate for ads that link to the particular domain when presented during user sessions that are associated with the user.

32. The method of claim 8, wherein the value of each correction factor is proportional to a ratio between the actual click through rate for ads that link to the particular domain when presented during user sessions that are associated with the user and the predicted click through rate for ads that link to the particular domain when presented during user sessions that are associated with the user.

33. The non-transitory computer-readable medium of claim 25, wherein the value of each correction factor is proportional to a ratio between the actual click through rate for ads that link to the one or more domains when presented during user sessions that are associated with the user and the predicted click through rate for ads that link to the one or more domains when presented during user sessions that are associated with the user.

* * * * *